United States Patent Office 3,448,589
Patented June 10, 1969

3,448,589
MILK COOLING AND COLD STORAGE APPARATUS
Frederick George Marshall and Greville Sandford Ravenscroft, Warwick, England, assignors to English Rose Kitchen Limited, Perry Barr, England, a British company
Filed Nov. 7, 1967, Ser. No. 681,272
Int. Cl. F25b *49/00, 23/00, 25/02*
U.S. Cl. 62—125          16 Claims

ABSTRACT OF THE DISCLOSURE

A bulk milk cooling cabinet is disclosed having a removable open top milk storage tank. When located in the cabinet the top of the storage tank is substantially closed by a cooling chamber in which an ice bank is generated and liquid from the cooling chamber is discharged against the sides of the tank. Extending through the top of the cabinet is a removable stirrer combined with means for filling the milk tank and removing milk therefrom. Means are included for weighing the storage tank and contents while housed in the cabinet.

---

The present invention is concerned with apparatus for dairy use for cooling and cold storage of milk in bulk quantities, and an object of the invention is to provide an improved construction of cooling and cold storage apparatus especially adapted for this purpose.

Immediately after milking, under current dairy practice it is usually necessary for the milk to be cooled and to be maintained in storage at a low temperature below, for example, 40° F.

In one commonly used procedure, especially in smaller establishments, the milk is placed in separate churns which are then cooled and kept in cold storage until collected for transport. With availability of bulk tanker transport, however, it is now frequently more convenient to cool and store the milk in bulk quantities, and suitable bulk milk cooling and cold storage apparatus is therefore required in which important design consideration include the provision of efficient and reliable cooling means and an ability to maintain high hygenic standards during use.

According to this invention, bulk milk cooling and cold storage apparatus comprises, in combination with associated cooling plant, a cabinet structure which houses a milk storage tank, said tank having an open top and being fitted and supported, upon movable carrier members, within an interior cooling chamber of the cabinet structure from which it can be withdrawn for cleaning by horizontal displacement through a side opening, said cooling plant including means for generating an ice-bank in heat-conducting relationship, directly or through an intermediate heat transfer liquid, with a roof portion of said cooling chamber which is adapted to cover and substantially to close the open top of the milk storage tank, said roof portion forming a heat-exchange partition presenting a cooling surface to said tank.

With the above-specified construction, inspection and cleaning of the milk container is facilitated by the removable fitting and open form of the storage tank, and during use the roof of the cooling chamber has a dual function of covering and substantially closing the open top of the tank and of providing a cooling surface which, in practice, may suffice to maintain the storage tank and milk content at the desired low temperature. For providing rapid initial cooling, the cooling plant also includes means for supplying cooling to the sides of the milk storage tank.

Convenience of withdrawal and ease of cleaning may be further improved by providing the cabinet structure with extensible arm members or rails which are adapted to guide and support the milk storage tank at opposite sides during withdrawal from the cooling chamber and which provide a pivot mounting upon which said tank can be rotated to a partially inverted position after withdrawal. Preferably, separate movable carrier members, such as rollers, are provided to support the base of the tank whilst housed within the cooling chamber. The main weight of the tank and milk content during use does not then normally have to be supported by the extensible arm members or rails which may form part of a pair of telescopic slide assemblies fixed to opposite walls of the cooling chamber.

To supplement the cooling effect of the roof portion of the cooling chamber and to increase the rate of heat transfer, especially during the phase of initial cooling of the storage tank when freshly filled with milk, means may be provided for circulating and discharging, against the sides of the tank, water or other intermediate heat transfer coolant liquid chilled by heat exchange with the ice-bank which is generated by freezing a separate static aqueous coolant medium in an ice-bank container which is preferably incorporated incorporated in an overhead cooling unit.

Alternatively, or in addition to the above cooling arrangement, a cooling coil for circulating liquid coolant medium in heat exchange relationship with the tank may be provided which at least partially surrounds the tank whilst housed within the cooling chamber.

The cooling coil may either be disposed in wall portions of the chamber housing in juxtaposition with sides of the storage tank, or it may be carried by and wrapped around the sides of the tank and be provided with flexible connecting pipes or hoses so that the tank can be withdrawn from the cooling chamber without uncoupling.

Although the use of a coolant liquid chilled by heat-exchange with the ice-bank is advantageous in reducing risk of overcooling and freezing of the milk, in some cases in order to obtain a sufficiently rapid initial cooling to comply with local dairy regulations, a cooling coil surrounding the milk tank as referred to above may be supplied directly with pressurised liquid refrigerant and may constitute an evaporator element of the cooling plant adapted to refrigerate the tank directly without an intermediate heat transfer liquid.

For agitating the contents of the milk storage tank the apparatus is also preferably provided with a stirrer unit which can be readily disconnected or moved so as not to interfere with withdrawal of the tank from the cooling chamber. This stirrer unit may also include a tube for filling and emptying the tank, together with other features, such as a thermometer for recording the milk temperature and a calibrated scale so that it can be utilized as a dipstick.

The apparatus may also be provided with means for weighing the storage tank and contents whilst housed within the cooling chamber.

By way of example, the invention will be more particularly described with reference to the accompanying drawings which illustrate diagrammatically various convenient embodiments in relation to milk cooling and cold storage apparatus for dairy use.

In said drawings.

FIGURE 11 is a view similar to FIGURE 9, but relating to a third embodiment;

In the first embodiment illustrated in FIGURES 1 to 9 of the drawings, the bulk milk cooling and cold storage apparatus comprises an open milk storage tank 1 which is housed within a cooling chamber 2 formed by the hollow interior of a lower part of a cabinet or storage enclosure structure 3 having a cooling unit 4 in an upper compartment.

Figure 1:
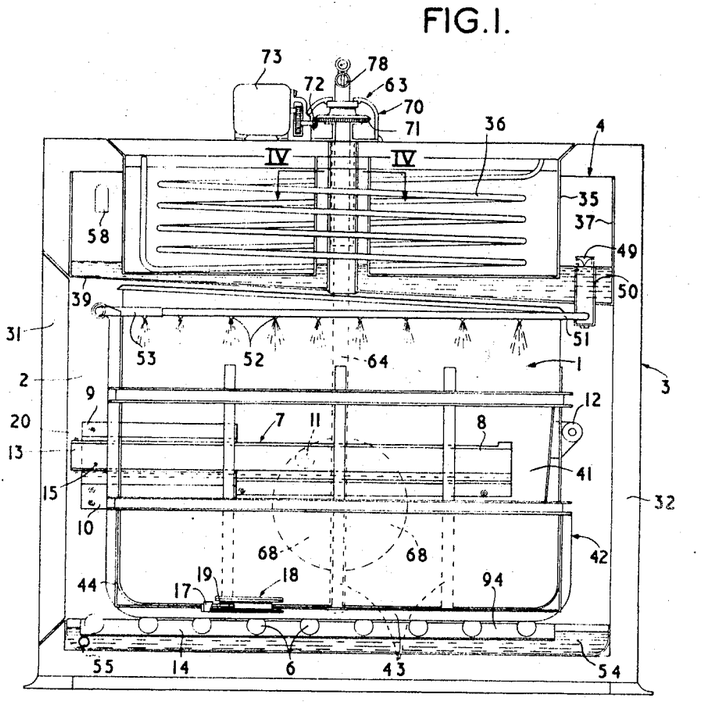
FIGURE 1 is a part-sectional side elevational general arrangement view of a first embodiment in which a cooling chamber is fitted with a bulk milk storage tank.
Figure 2:
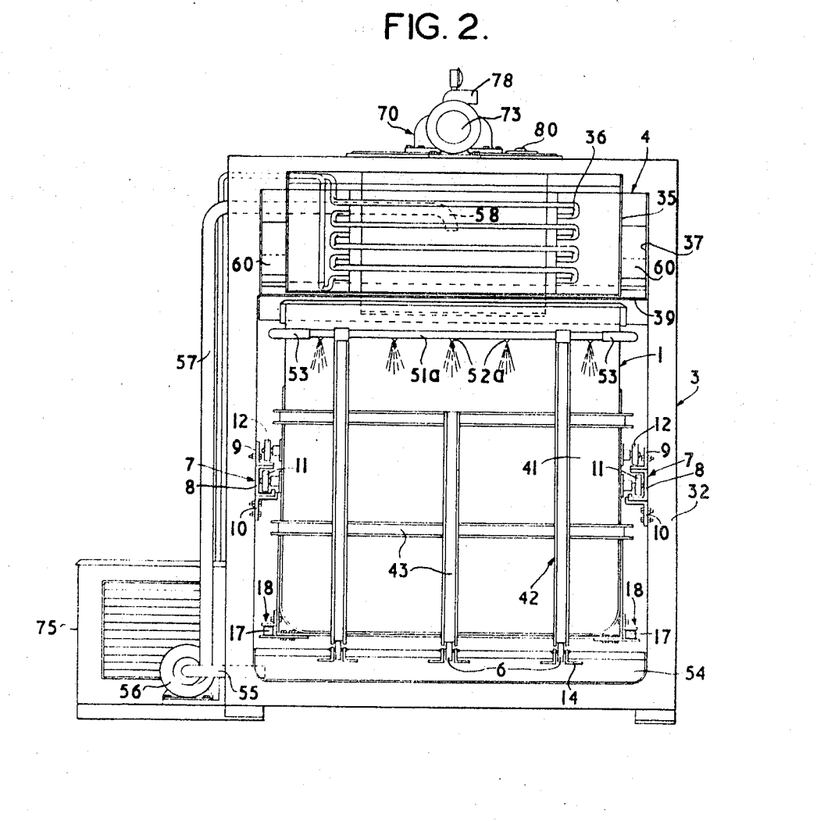
FIGURE 2 is a diagrammatic part-sectional end elevational view.
Figure 2:
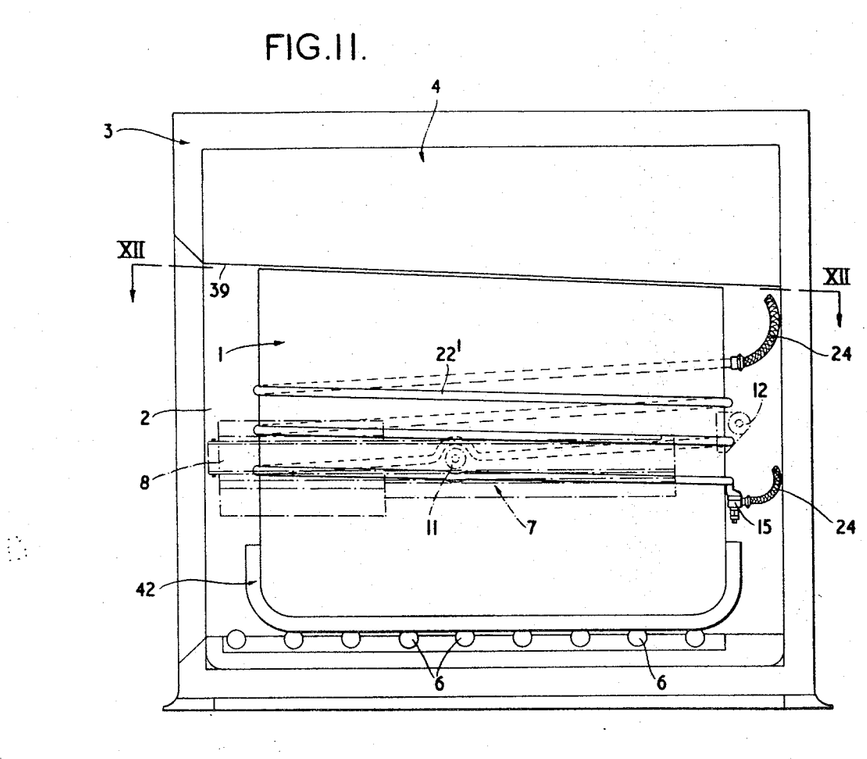
Figure 3:
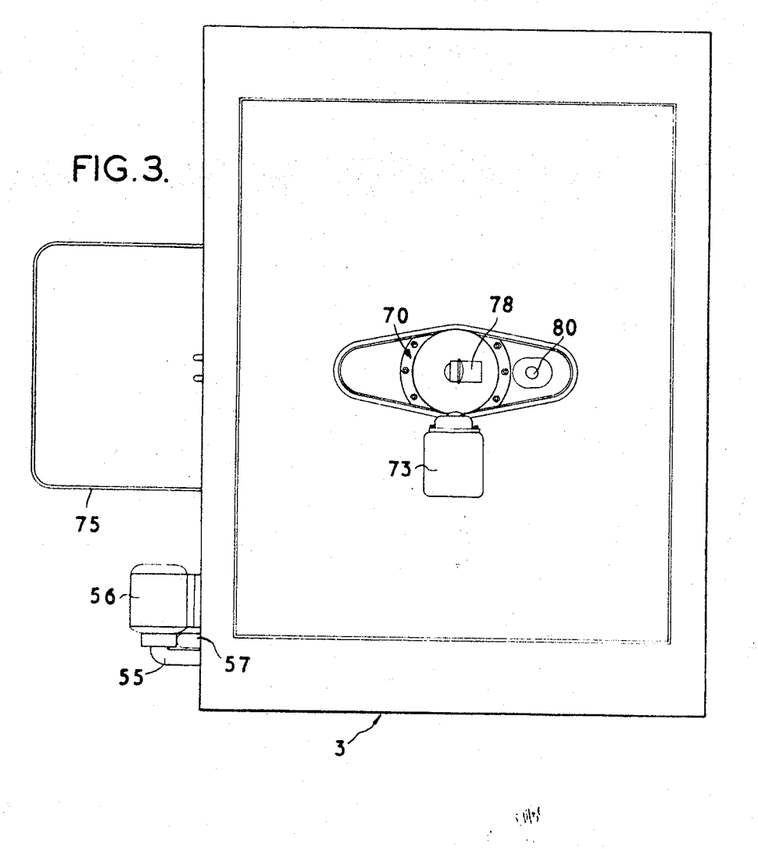
FIGURE 3 is a top plan view.

The storage tank 1 is in the form of a thin-walled stainless steel vessel 41 carried, in this particular embodiment, by a cradle frame structure 42 composed of frame members 43 and a sheet-metal base tray 44.

When fitted within the cooling chamber 2, the tank 1 is supported by and rests upon a series of rotatably-movable rollers 6 adapted to engage some of the frame members 43 of the cradle frame structure 42 which extend under the base of the tank. These rollers 6 are mounted on carrier members 14 which may be adjustably mounted in position to accommodate storage tanks of different depth.

The tank 1 is adapted to be withdrawn from the cooling chamber 2 by horizontal displacement through an opening or doorway 31 in one side of the cabinet structure 3 which is normally closed by a hinged door (not shown). For guiding and supporting the tank at opposite sides during withdrawal, there is provided a pair of telescopic slide assemblies 7 which each include an inner extensible arm member or rail 8 of channel section mounted in a slide-way formed by angle-section members 9, 10, fixed to the respective interior side wall of the cooling chamber 2. Fitted to each side of the storage tank 1 is a pair of rollers 11, 12. The front roller 11 engages within the channel of the adjacent extensible arm member or rail 8 and is supported thereby during withdrawal, whilst the rear roller 12 engages and is supported by a flange of the angle-section member 9 of the associated slide-way during withdrawal, as indicated most clearly in FIGURE 7.

When the arms or rails 8 are fully extended and the tank 1 is fully withdrawn, the front rollers 11 travel forward to the maximum extent and engage a stop formed by a block 13 which closes the open outer end of the channel of the respective arm or rail 8. These rollers 11 can then be retained in this position by inserting a retaining pin through an aperture 15 adjacent the outer end of each arm or rail, and the storage tank 1 can then be caused to pivot about the axis of the front rollers 11 and to be rotated to a partially inverted position as indicated in broken lines in FIGURE 7, so as further to facilitate emptying and cleaning.

To limit the degree of inversion, the cradle frame structure 42 carries an abutment stop or buffer 17 which contacts the underside of the adjacent extended arm or rail 8 and a releasable catch 18 is also provided to lock the tank 1 temporarily in its inverted position. The releasable catch 18 conveniently includes a pivoted spring-biased roller-carrying arm 19 which can be selectively set either in an inoperative position in which it tends to lie close to the underside of the tank or in an operative position in which it tends to project outwardly and engages within the channel of the respective extended arm member or rail 8.

The cooling unit 4 in the upper part of the cabinet structure 3 comprises an inner coolant tank 35 fitted within an outer coolant tank 37. The inner coolant tank 35 contains an evaporator coil 36 of a conventional refrigeration system operated by a motor-driven compressor in a housing 75, and it is adapted to be filled with water or other static aqueous coolant medium capable of being readily frozen by evaporator 36 to generate a static ice-bank.

The outer coolant tank 37 provides a reservoir for water or other liquid, such as brine, serving as an intermediate heat transfer coolant which is chilled by heat exchange with the ice-bank in the inner coolant tank 35.

Both inner and outer coolant tanks 35 and 37 are composed of sheet metal giving a high thermal conductivity, and the bottom wall of the outer tank 37 or base of the cooling unit is inclined and forms a roof portion 39 of the cooling chamber 2 adapted to present a cooling surface to the milk storage tank and to cover and substantially to close the open top of the latter during use.

As shown, the open top of the milk storage tank 1 is also inclined in conformity with the slope of the cooling chamber roof 39 and lies in close proximity to said roof when the tank is in position in the cooling chamber. The closeness of fit, however, is dependent upon the extent to which the storage tank 1 is introduced into the cooling chamber and preferably, the tank is positioned so that a small clearance gap, for example, one eighth of an inch, is left to reduce danger of freezing or icing-up of condensate at this point which would hinder subsequent withdrawal of the tank. If actual surface contact and full sealing is required, the risk of freezing or icing-up may alternatively be reduced somewhat by bevelling the top of the storage tank to provide a knife edge yielding substantially line contact, or by fitting a narrow sealing strip of plastics material which may have a non-porous cellular structure.

In contrast to the roof portion 39 of the cooling chamber which is designed to act as a heat-exchange partition, the side walls are spaced from the sides of the milk storage tank 1 and have a thick lining 32 of thermally-insulating material.

The intermediate heat transfer coolant liquid chilled in the cooling unit 4 is circulated and utilised to apply localised cooling to the sides of the milk storage tank 1 in the following manner.

From the outer coolant tank 37, the coolant liquid flows through a gauze filter 49 into an outlet tube 50 when its level is sufficiently high, and from the tube 50 it passes into distribution conduits 51 which extend horizontally along the side walls of the cooling chamber adjacent the top of the tank 1. These conduits 51 are provided with a series of perforations or spraying orifices 52 along their length which are adapted to discharge or spray jets of the chilled coolant liquid against the sides of the storage tank 1. When the latter is in position within the cooling chamber, the outer ends of the two conduits 51 along opposite sides are linked together by a separate end section 51a which is carried by the cradle frame structure 42 and which is connected by short lengths of flexible hose 53. This end section 51a is also advantageously provided with a series of perforations or spraying orifices 52a.

After being sprayed against the storage tank 1, the coolant liquid drains down and is collected in a trough or sump 54 beneath the rollers 6 at the bottom of the cooling chamber. From this trough or sump 54, the coolant liquid passes through a pipe 55 to a pump 56 which delivers it back to the coolant tank 37 of the cooling unit by way of a return pipe 57 and inlet 58. The inlet 58 is above the level of the outlet 50 so that there should be no blockage if the liquid in coolant tank 37 freezes during a temporary period of inactivity of the circulatory system.

Figure 6:
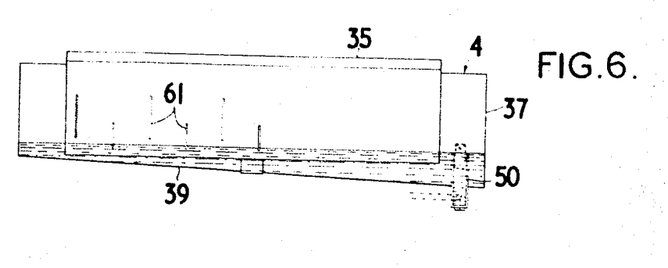
FIGURE 6 is a side elevational view of the cooling unit of the structure of FIGURE 1.
Figure 7:
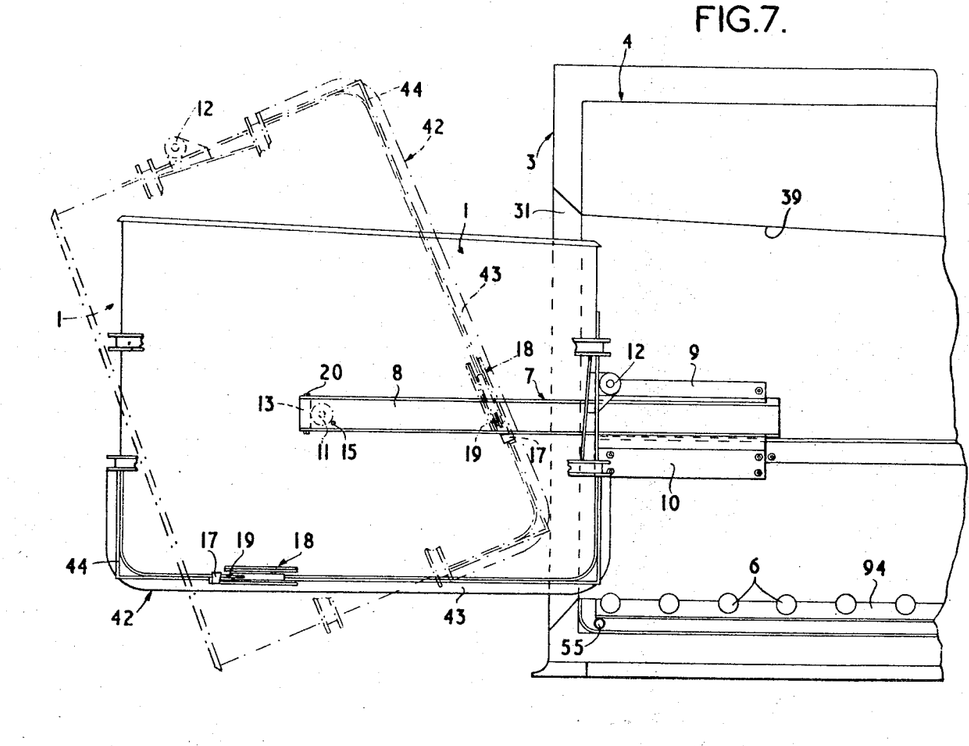
FIGURE 7 is a side elevational view showing diagrammatically the bulk milk storage tank withdrawn from the cooling chamber.
Figure 8:
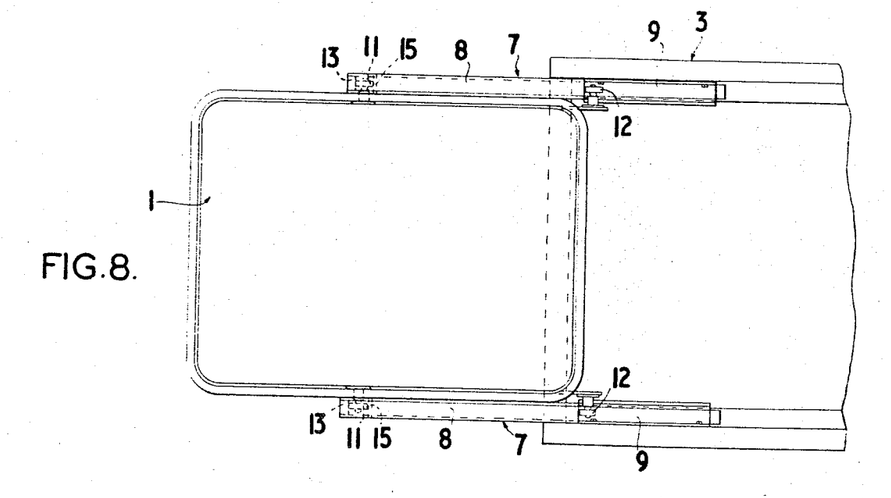
FIGURE 8 is a plan view corresponding to FIGURE 7.

In passing through the coolant tank 37 between the inlet 58 and outlet 50 which are at opposite ends, the coolant liquid passes through side galleries 60 formed by the spaces between the sides of the two coolant tanks 37 and 37, and these galleries 60 are provided with a series of metal baffle plates 61 arranged in staggered relationship, as indicated in FIGURE 6, in order to improve the heat exchange characteristics, especially after recommencing circulation after a stoppage which has resulted in freezing of the liquid in coolant tank 37.

As the static coolant medium in the inner coolant tank 35 is separate from the circulated heat transfer liquid, it can readily be kept frozen to maintain a permanent ice-bank during use which provides a reserve cooling capacity useful in the event of temporary power failure or for permitting selective intermittent operation of the refrigeration system. Furthermore, the degree of cooling of the intermediate circulated heat transfer liquid can be varied by altering its rate of flow and undesirable overcooling can be avoided.

A further feature of this particular apparatus is that it is provided with a removable stirrer unit for agitating the contents of the storage tank 1.

Figures 4, 5, 5A:
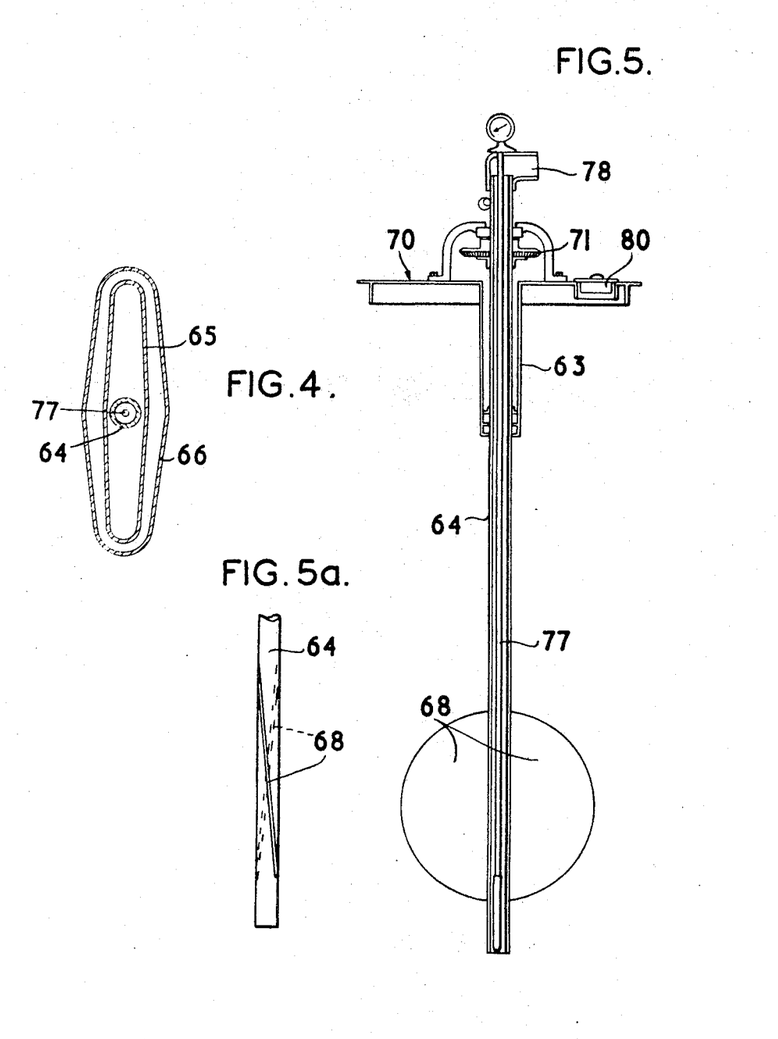
FIGURE 4 is a detail sectional view on line IV—IV of a FIGURE 1.
FIGURE 5 is a separate view of the stirrer unit assembly indicated in FIGURE 1.
FIGURE 5a is a fragmentary detail view of the lower end of the stirrer unit.

As shown most clearly in FIGURES 5 and 5a, this stirrer unit, denoted generally by the reference numeral 63, comprises a hollow tubular shaft 64 which passes vertically through elongated apertures 65 and 66 in the tanks 35 and 37 respectively of the cooling unit (see FIGURE 4), and the lower end of the shaft 64 extends into the interior of the storage tank 1 and is fitted with a pair of slightly inclined, semi-circular, paddles or agitator vanes 68.

The upper portion of the shaft 64 is rotatably mounted in a carrier plate and cover assembly 70 which seats upon the top of the cooling unit 4, and when in position, a bevel gear 72 fast on the shaft 64 meshes with an output drive pinion 72 of a reduction gear train powered by motor 73.

In this embodiment, the stirrer unit 63 is not fixed and can readily be lifted and removed by upward displacement when, for example, it is required to withdraw the milk storage tank 1. The stirrer unit can also be moved horizontally to a small extent, and either horizontal displacement or lifting of the unit automatically moves the gear 71 out of engagement with the drive pinion 72. After disengaging the drive by shifting the stirrer unit slightly as mentioned above, the shaft 64 can be rotated manually. This facility may be of value in the event of a power failure.

The shaft 64 is open at both ends and also serves as a carrier for a thermometer 77 for recording the temperature of the milk content of the tank 1, and as a delivery tube for filling the tank with milk or for pumping milk out of the tank. As shown, the top end of the shaft 64 conveniently carries a tubular angle fitting 78 for facilitating connection to external pipes or conduits. The shaft 64 may also be calibrated to serve as a dipstick for measuring the quantity of milk.

The carrier plate assembly 70 is also conveniently fitted with a removable plug 80 which is useful for providing access to the interior of the storage tank for the purpose of removing samples of the contents, for testing, for example.

To remove the milk storage tank 1 from the apparatus it can be disengaged from the extensible arm members or rails 8 by removing the blocks 13 which close the open outer ends of the channels of the latter and which are normally held in place by a detachable bolt 20. The tank 1 can then be drawn forward and lifted clear after withdrawal from the cooling chamber. This facility is useful to enable the tank to be removed and transported, for example by a tractor fitted with a carrying fork, to a remotely-situated milking station or "bail" close to the grazing site of the cows, such as are employed on some large dairy farms. For the purpose of transport and bringing back the milk to the cooler in these circumstances, the tank may be fitted with a removable temporary lid or cover provided with depending baffle plates to reduce surging of the contents.

Figure 9:
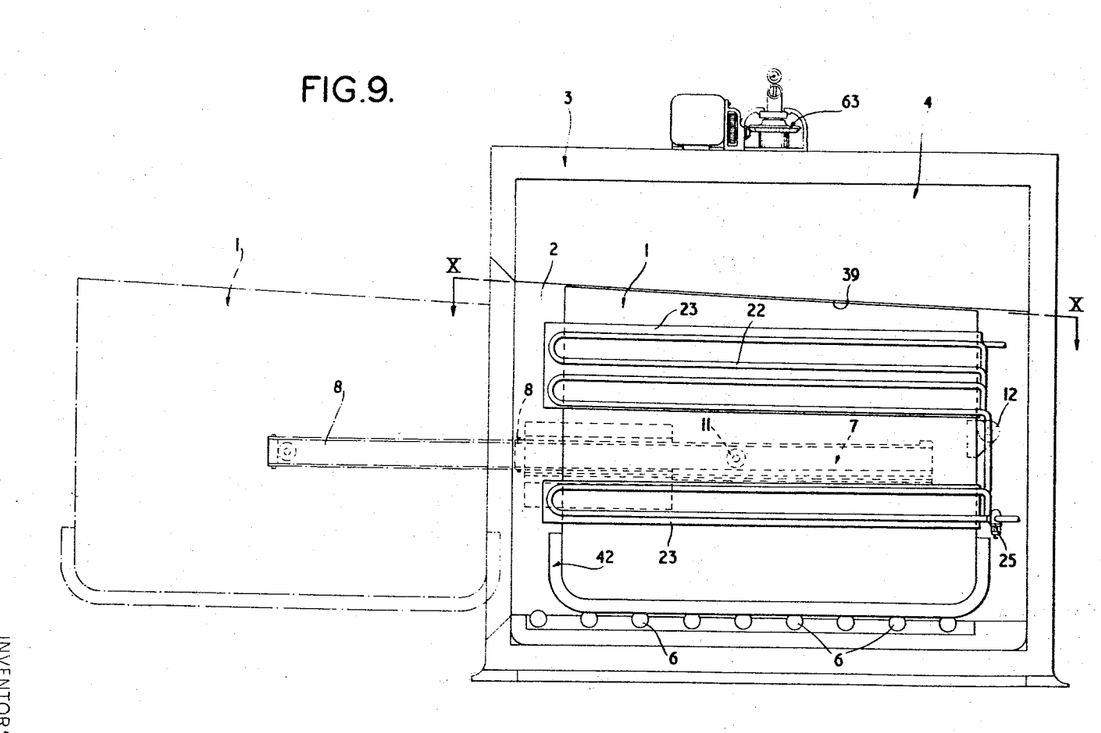
FIGURE 9 is a diagrammatic side view of a second embodiment.
Figure 10:
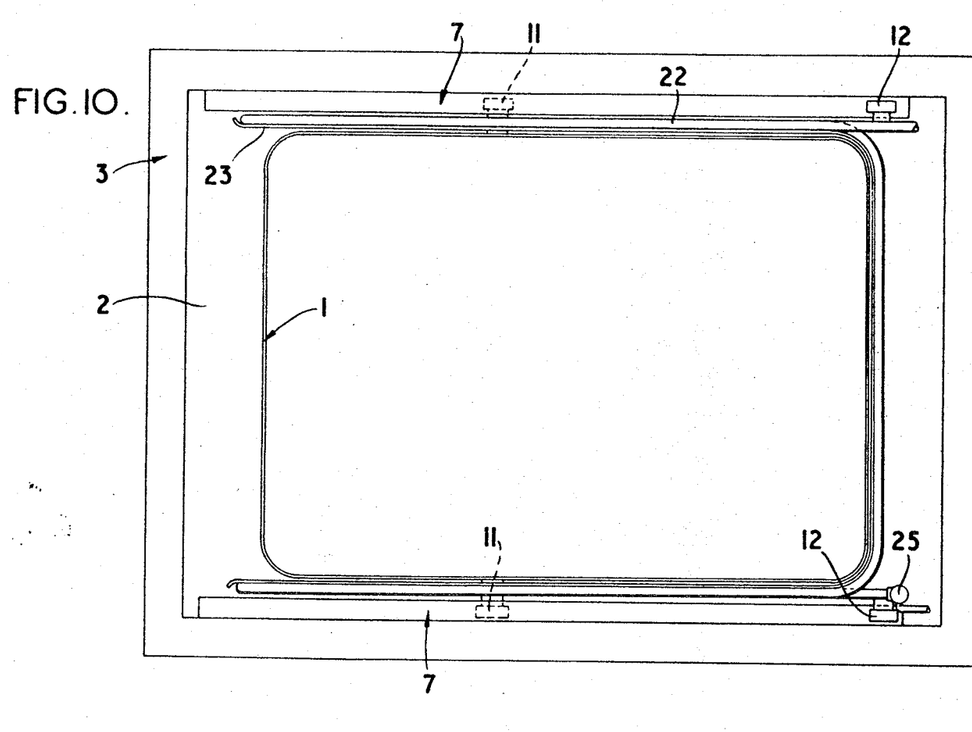
FIGURE 10 shows a horizontal cross-section along line X—X of FIGURE 9.

In the second embodiment which is illustrated diagrammatically in FIGURES 9 and 10 and which represents a modification of the apparatus already described in detail, the same reference numerals are used to indicate like parts. Again, an open milk storage tank 1 is housed within a cooling chamber 2 of a cabinet structure 3 containing an overhead cooling unit 4 of which the base forms a roof portion 39 of the cooling chamber adapted to cover and substantially to close the inclined open top of the tank 1 and to present a cooling surface to the latter. The tank is also adapted to be withdrawn on extensible arm members or rails 8 and has a removable combined stirrer, filler, dipstick and thermometer unit 63 as before.

The principal feature of difference in this second embodiment is that the side walls of the cooling chamber 2 are fitted with an evaporator cooling coil 22 arranged so as to surround three sides of the storage tank. The coil 22 is secured to metal cooling plates 23 which engage or fit in closely-spaced heat exchange relationship with the sides of the tank, and it is supplied with compressed liquid refrigerant through an expansion valve 25 from an associated conventional refrigeration system which may be housed externally to the main cabinet structure 3.

The evaporator cooling coil 22 will normally be brought into operation only for the initial cooling of the milk delivered into the tank 1 and it will be controlled by thermostatic control means.

For maintaining the milk at a low temperature after initial cooling, although means may be provided for spraying chilled water from the cooling unit 4 against the tank as in the arrangement described in the previous embodiment it can suffice merely to maintain chilled or frozen liquid coolant in contact with the base of the cooling unit forming the roof and heat exchange surface 39 above the tank. In this case, if desired, the cooling unit 4 may be modified so that substantially the whole of its interior is occupied by an ice-bank in direct contact with the cooling chamber roof 39.

Figure 12:
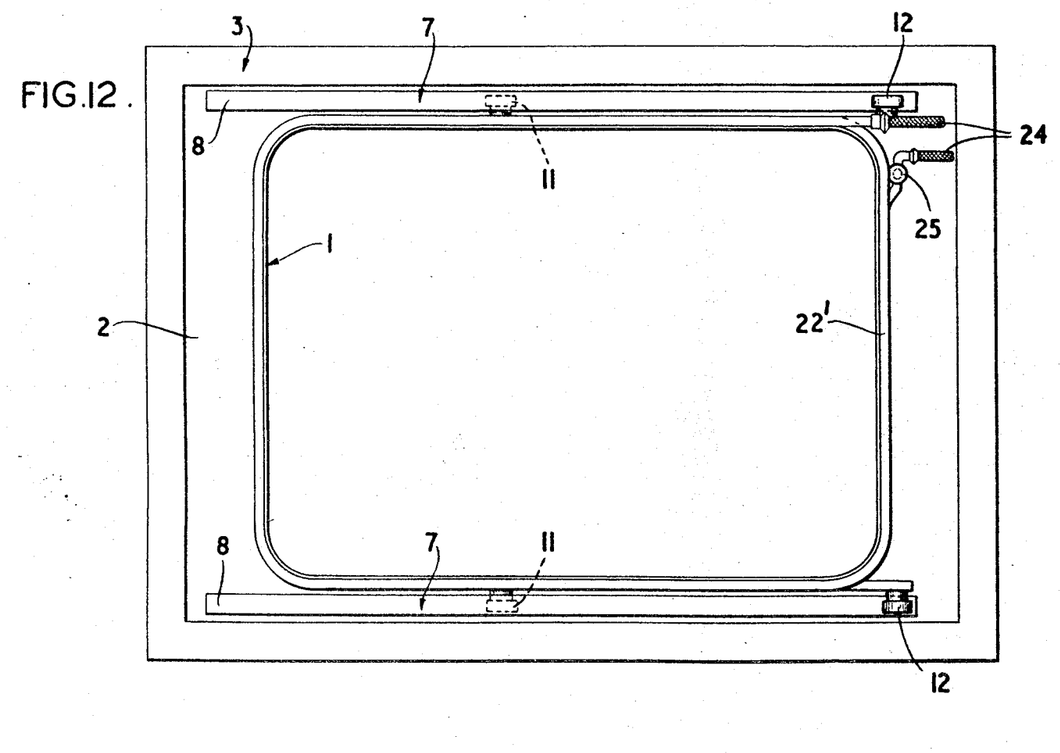
FIGURE 12 shows a horizontal cross-section along line XII—XII of FIGURE 11.

The bulk milk cooling and storage apparatus illustrated in FIGURES 11 and 12 is similar to that of the second embodiment and the same references are again used to denote like parts, but the evaporator cooling coil for carrying out initial rapid cooling is in this case carried by and wrapped around the sides of the tank 1 and is indicated by reference 22'. To permit the tank 1 to be withdrawn without uncoupling, the ends of this evaporator cooling coil 22' are provided with flexible plastic hoses or pipes 24 for connection to the remainder of the refrigerator circuit.

By mounting the evaporator cooling coil on the tank in this manner, a relatively wide clearance space may be provided at each side within the cooling chamber so that no difficulties are likely to arise from freezing and icing up between the sides of the tank and of the cooling chamber walls.

Figure 13:
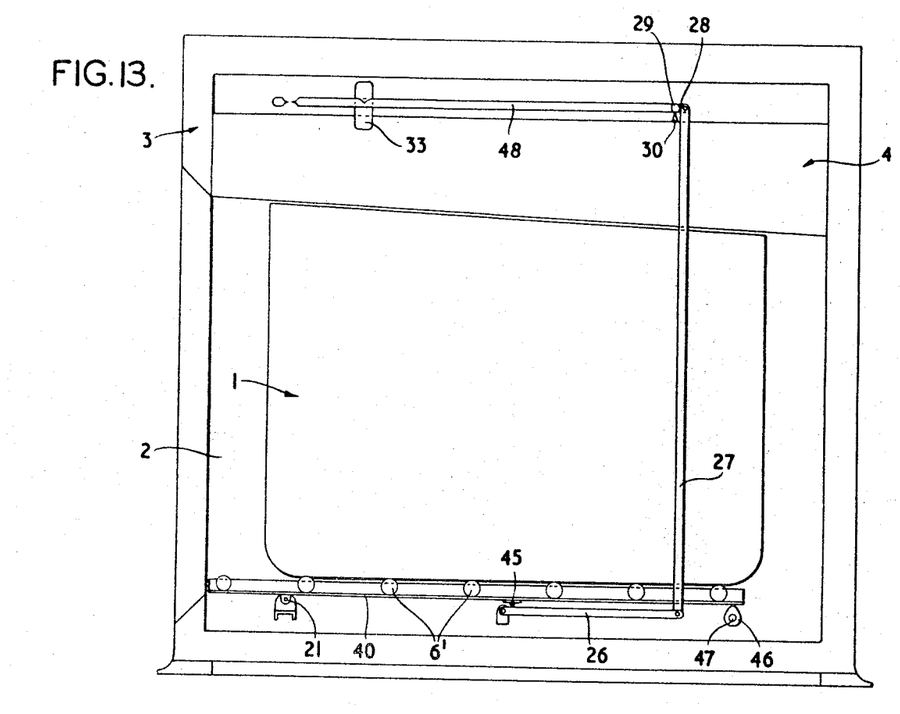
FIGURE 13 is a side view showing one form of weighing arrangement which may be incorporated for weighing the tank and contents.
Figure 14:
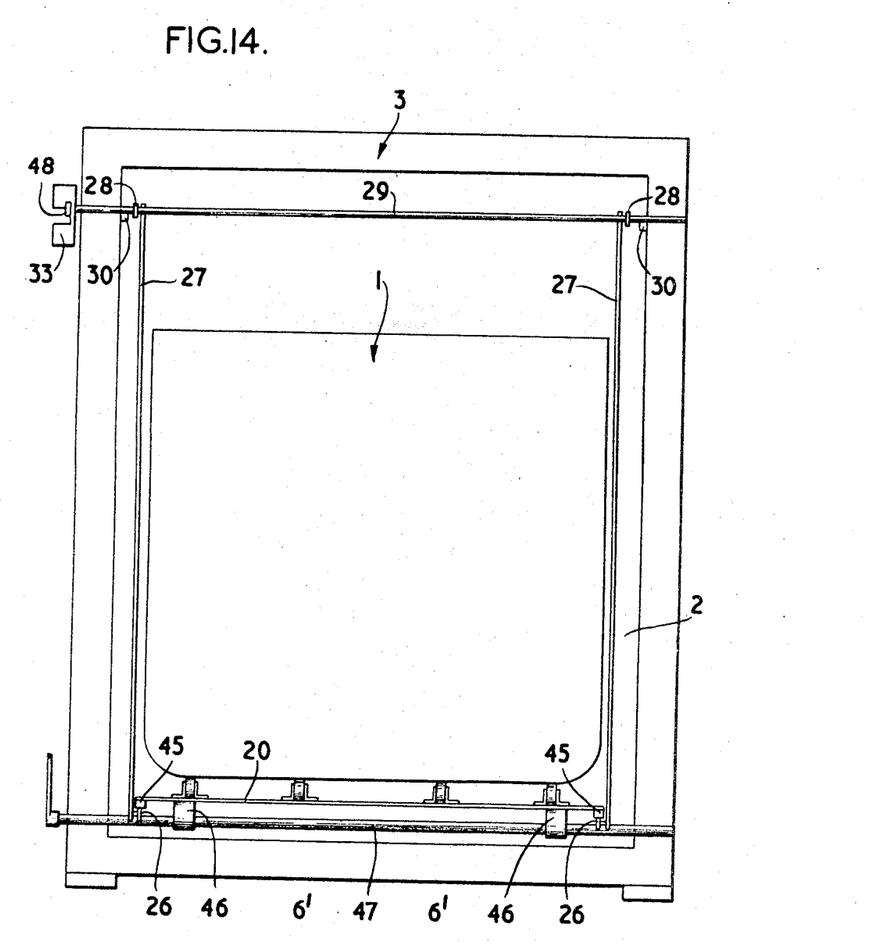
FIGURE 14 is an end view of the arrangement shown in FIGURE 13.

The weighing arrangement illustrated diagrammatically in FIGURES 13 and 14 is applicable to any of the embodiments previously described. As shown, rollers 6' which bear the weight of the tank 1 within the cooling chamber 2 are carried by a platform 40 which is pivoted towards one end at 21, and which is normally supported at the opposite end by a pair of cams 46 mounted on a manually rotatable cam shaft 47.

At each side, in the centre region of its length, the platform 40 is fitted with a depending knife edge 45 directly above a lower pivoted arm or beam 26 which is connected at its outer end by a vertically-extending link 27 to a short lever arm 28 carried by a cross-bar 29 rotatably supported on knife edges or bearings 30, 30. The one end of this cross-bar 29 projects through the wall of the cabinet or storage enclosure structure 3 and is rigidly connected to a relatively long upper arm or beam 48 fitted with a slidable counter weight 33.

This weighing device is selectively brought into operation by rotating the cam shaft 47 to lower the platform 40, thereby causing the weight of the tank and contents to be applied to the lower beams 26 through knife edges 45. Movement of the latter is then balanced by adjusting the counter weight 33. The position of said weight 33 then gives an accurate measure of the weight of the tank which can be conveniently read off from a calibrated scale so that the quantity of milk can be readily estimated.

Other forms of weighing devices, which may provide a direct reading, can, however, be used if desired.

FIGURES 15 to 19 illustrate ways in which the stirrer unit hereinbefore described can be modified to provide an alternative method of permitting the milk storage tank to be withdrawn from the cooling chamber which does not require the complete stirrer unit to be removed.

In each of the two modifications shown the stirrer unit, here denoted by the general reference 63a, has a vertical tubular drive shaft 64a composed of two separate parts, a lower section 84 and an upper section 83.

The lower section 84 depends within the interior of the tank 1 and again carries paddles or agitator blades 68a, and the upper section 83 extends through the centre of the cooling unit 4 and is operatively connected through gearing to the drive motor 73 at the top of the cabinet structure.

In this general arrangement, the upper section 83 of the drive shaft is rotatably supported by the cabinet structure and may be axially fixed so it is not required to be removed in normal use. Its lower end projects slightly into the cooling chamber 2 and is connected to the lower section 84 by disconnectable coupling means.

Figure 15:
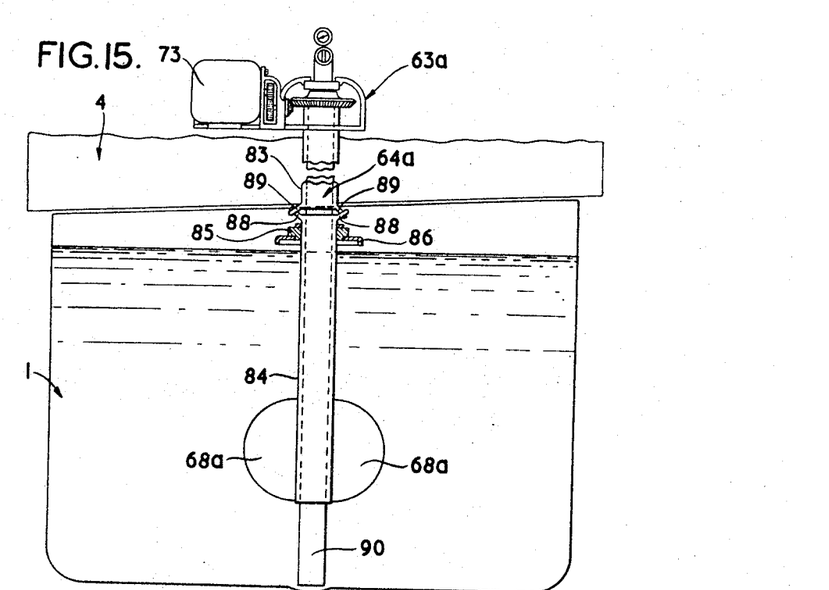
FIGURE 15 is a side elevational and sectional view showing diagrammatically the milk storage tank fitted with a modified form of stirrer unit.
Figure 16:
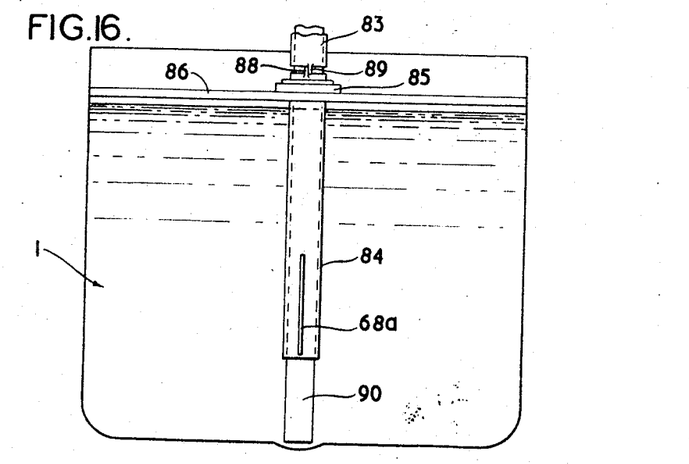
FIGURE 16 is an end view of the arrangement of FIGURE 15.

In the first modification shown in FIGURES 15 and 16, the lower section 84 is rotatably mounted by a bearing 85 on a carrier cross-bar fitted within the tank 1, and at its upper end it is provided with a pair of upwardly-projecting inclined drive fingers 88. Both the bearing 85 and the cross-bar 86 may advantageously be composed of a plastics material, such as nylon for example.

In use, the top end of the lower section 84 of the drive shaft 64a is axially aligned with, and slightly spaced from, the opposed lower end of the upper section 83, and the upwardly-projecting drive fingers 88 engage a pair of complementary downwardly-projecting inclined drive fingers 89 provided on said lower end of the upper section. Also, the two sections 83 and 84 are located and maintained in axial alignment by a removable inner tube 90 which is loosely fitted within the drive shaft 64a and which extends to the bottom of the tank 1 for the purpose of delivering or emptying the milk.

When it is required to withdraw the tank 1 from the cooling chamber 2, the inner milk filler and drainage tube 90 is first withdrawn from the drive shaft and the two sections 83 and 84 of the latter and the interengaging pairs of drive fingers 88, 89, move clear of each other and automatically disconnect the coupling upon displacing the tank horizontally. The tank 1 can then be withdrawn without hindrance, the slope of the open top enabling the inner end wall to clear the projecting lower end of the upper drive shaft section 83.

Figure 17:
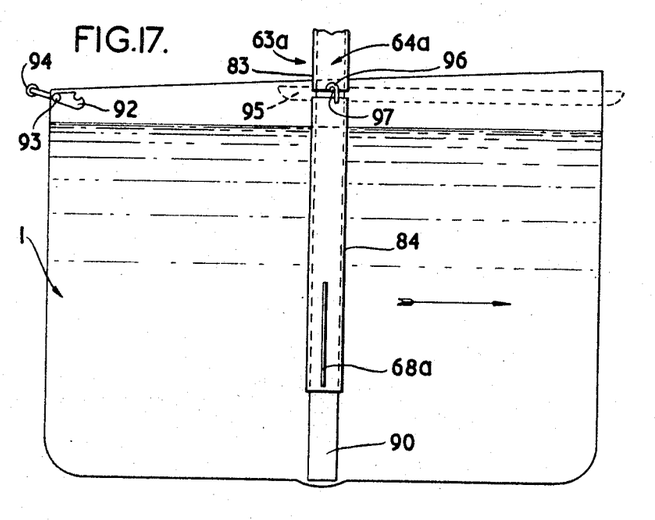
FIGURE 17 is a view similar to FIGURE 15 showing a further modified form of stirrer unit.
Figure 18:
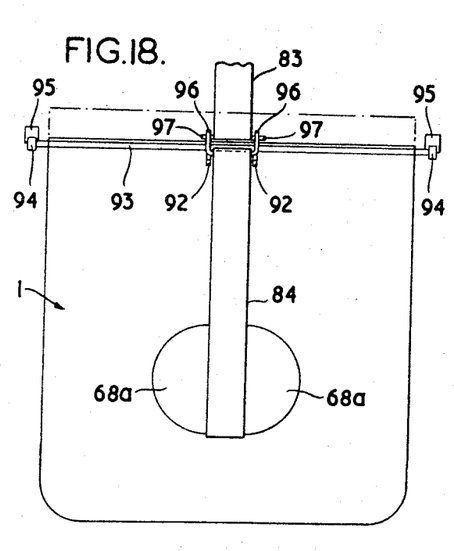
FIGURE 18 is an end view of the arrangement of FIGURE 17.
Figure 19:
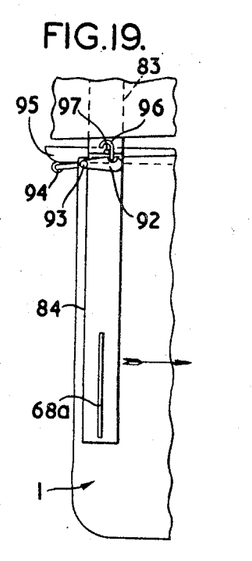
FIGURE 19 is a fragmentary detail view indicating the mode of operation of the automatic release device shown in FIGURES 17 and 18.

In the second modification shown in FIGURES 17 to 19, the arrangement is similar to that described above and the same references are used to denote like parts, but in this case the lower section 84 of the drive shaft 64a is supported by the upper section 83 through a releasable hook and peg coupling device which is adapted to transmit rotary drive and which comprises a pair of hooks 96, 96 on section 84 and a pair of cooperating drive pegs 97, 97, on section 83. With this arrangement, the tank 1 is provided with a forked release member 92 mounted on a rocker shaft 93 having a striker part 94 which, as the tank is withdrawn, engages a cam plate 95 fitted to a side wall of the cooling chamber.

In withdrawing the tank 1, after removing tube 90, the drive shaft 63a is rotated and set manually to a predetermined angular position indicated by a suitable marker. Then, during the displacement of the tank, as shown in FIGURE 19, the release fork member 92 moves under the pair of coupling hooks 96, 96, and is lifted by the action of the cam plate 95 to disengage said hooks from the drive pegs 97, 97, carried by the upper section 83 of the drive shaft. The lower section 84 is thereby automatically disconnected and is carried forwards with the tank by the release member 92.

In a further modification, not shown, a lower section of the stirrer unit drive shaft rotatably mounted on a carrier member fitted within the milk tank, as in the modification of FIGURES 15 and 16, may be connected directly to an upper section by means of a simple removable key. This key may conveniently be provided by a milk filler and drainage tube removably fitted within the drive shaft as described, this tube being adapted to transmit the rotary drive through, for example, splines, ribs or other outer peripheral projections which engage and cooperate with complementary formations on the inner periphery of the drive shaft sections.

We claim:
1. Bulk milk cooling and cold storage apparatus comprising, in combination, a cabinet structure having an interior cooling chamber provided with a side opening, a milk storage tank having an open top housed within said cooling chamber of the cabinet structure, a roof portion of said cooling chamber which covers and substantially closes the open top of the milk storage tank, movable carrier members supporting said storage tank within the cooling chamber and adapted to enable said tank to be withdrawn for cleaning by horizontal displacement through said side opening, and cooling plant associated with said cabinet structure, said cooling plant including means for generating an ice-bank in heat conducting relationship with said roof portion of the cooling chamber which constitutes a heat-exchange partition presenting a cooling surface to said storage tank.

2. Bulk milk cooling and cold storage apparatus according to claim 1, wherein the cabinet strutcure is provided with extensible arm members adapted to guide and support the milk storage tank at opposite sides during withdrawal from the cooling chamber and which provide a pivot mounting upon which said tank can be rotated to a partially inverted position to facilitate complete emptying and cleaning, said cabinet being fitted with separate movable carrier members to support the underneath base of said tank whilst housed within the cooling chamber.

3. Bulk milk cooling and cold storage apparatus according to claim 2, wherein the extensible arm members are provided at their extremity with releasable catch means to permit of the milk storage tank being completely disengaged therefrom after withdrawal from the cooling chamber whereby said tank can readily be lifted clear and removed when required.

4. Bulk milk cooling and cold storage apparatus according to claim 1 in which the milk storage tank comprises a thin-walled vessel and a supporting carrier frame structure.

5. Bulk milk cooling and cold storage apparatus according to claim 1, wherein means are provided for circulating and discharging, against the sides of the milk storage tank disposed within the cooling chamber, an intermediate heat transfer coolant liquid chilled by heat exchange with the ice-bank which is generated by freezing a separate static aqueous coolant medium.

6. Bulk milk cooling and cold storage apparatus according to claim 5, wherein the roof portion of the cooling chamber is formed by the base of an overhead cooling unit comprising an outer coolant tank which provides a reservoir for the intermediate heat transfer coolant liquid and an inner coolant tank which is fitted with a refrigerator evaporator element and which forms a container for the ice-bank.

7. Bulk milk cooling and cold storage apparatus according to claim 6, wherein the outer coolant tank of the cooling unit has an outlet adjacent one end for the coolant liquid located above the level of the lowermost part of the inner coolant tank, and has an inlet adjacent the opposite end which is located above the level of said outlet.

8. Bulk milk cooling and cold storage apparatus, according to claim 1, wherein the cooling plant includes a refrigeration evaporator coil which at least partially surrounds the milk storage tank disposed within the cooling chamber to provide means for rapid initial cooling.

9. Bulk milk cooling and cold storage apparatus according to claim 8, wherein the refrigeration evaporator coil is carried by and is wrapped around the sides of the milk storage tank, and wherein flexible connecting pipes are joined to the ends of said coil to enable the tank to be withdrawn out of the cooling chamber without disconnecting said coil.

10. Bulk milk cooling and cold storage apparatus according to claim 1, wherein the open top of the milk storage tank is inclined downwardly towards its inner end to conform with a corresponding slope of the roof portion of the cooling chamber.

11. Bulk milk cooling and cold storage apparatus, according to claim 1, fitted with a stirrer unit which includes a rotary drive shaft extending vertically through the upper part of the cabinet structure and an agitator adapted to operate within the interior of the milk storage tank being carried by the lower end of said rotary drive shaft, said cabinet structure also having a seating surface for supporting said stirrer unit and having power drive means disengageably coupled to said rotary drive shaft, whereby said stirrer unit can be raised by upwards displacement so as to clear of the storage tank when the latter is required to be withdrawn.

12. Bulk milk cooling and cold storage apparatus according to claim 11, wherein the drive shaft of the stirrer unit is of hollow tubular form and is adapted for use in filling the storage tank with milk or for use in removing milk therefrom.

13. Bulk milk cooling and cold storage apparatus, according to claim 1, further incorporating a stirrer unit provided with a tubular vertical rotary drive shaft having a lower section which depends within the interior of the milk storage tank, an agitator carried by said lower section, and a separate upper section, means for rotatably mounting said upper section in the cabinet structure, and associated rotary power drive means operatively connected to said upper section, the lower end of said upper section projecting into the cooling chamber, and disconnectible coupling means connecting the projecting lower end of said upper section to said lower section, said storage tank being shaped to provide clearance between its inner end and the projecting lower end of the upper section of said drive shaft to enable complete withdrawal of the tank from the cooling chamber after disconnection of said coupling means.

14. Bulk milk cooling and cold storage apparatus according to claim 13, wherein a carrier member is fitted within the milk storage tank and supports the lower section of the rotatable stirrer drive shaft, and wherein the coupling means comprises interengageable complementary upwardly-projecting and downwardly-projecting drive fingers provided on the opposed ends of the lower and upper sections of the stirrer drive shaft respectively which automatically disengage when the milk tank is displaced horizontally during withdrawal from the cooling chamber.

15. Bulk milk cooling and cold storage apparatus according to claim 13, wherein a release member is carried by the milk storage tank and wherein the coupling means comprises a device which engages and cooperates with said release member to disconnect automatically the lower section of the stirrer drive shaft when said tank is displaced horizontally during withdrawal from the cooling chamber.

16. Bulk milk cooling and cold storage apparatus according to claim 1, wherein means are incorporated for weighing the storage tank and contents whilst housed within the cooling chamber.

References Cited

UNITED STATES PATENTS

| | | | |
|---|---|---|---|
| 504,986 | 9/1893 | Kurtz | 62—382 |
| 2,256,971 | 9/1941 | Chamberlain | 62—392 X |
| 2,713,251 | 7/1955 | Cann et al. | 62—157 |
| 2,824,432 | 2/1958 | Varse et al. | 62—393 |

ROBERT A. O'LEARY, *Primary Examiner.*

U.S. Cl. X.R.

62—302, 382, 392, 393, 430